UNITED STATES PATENT OFFICE.

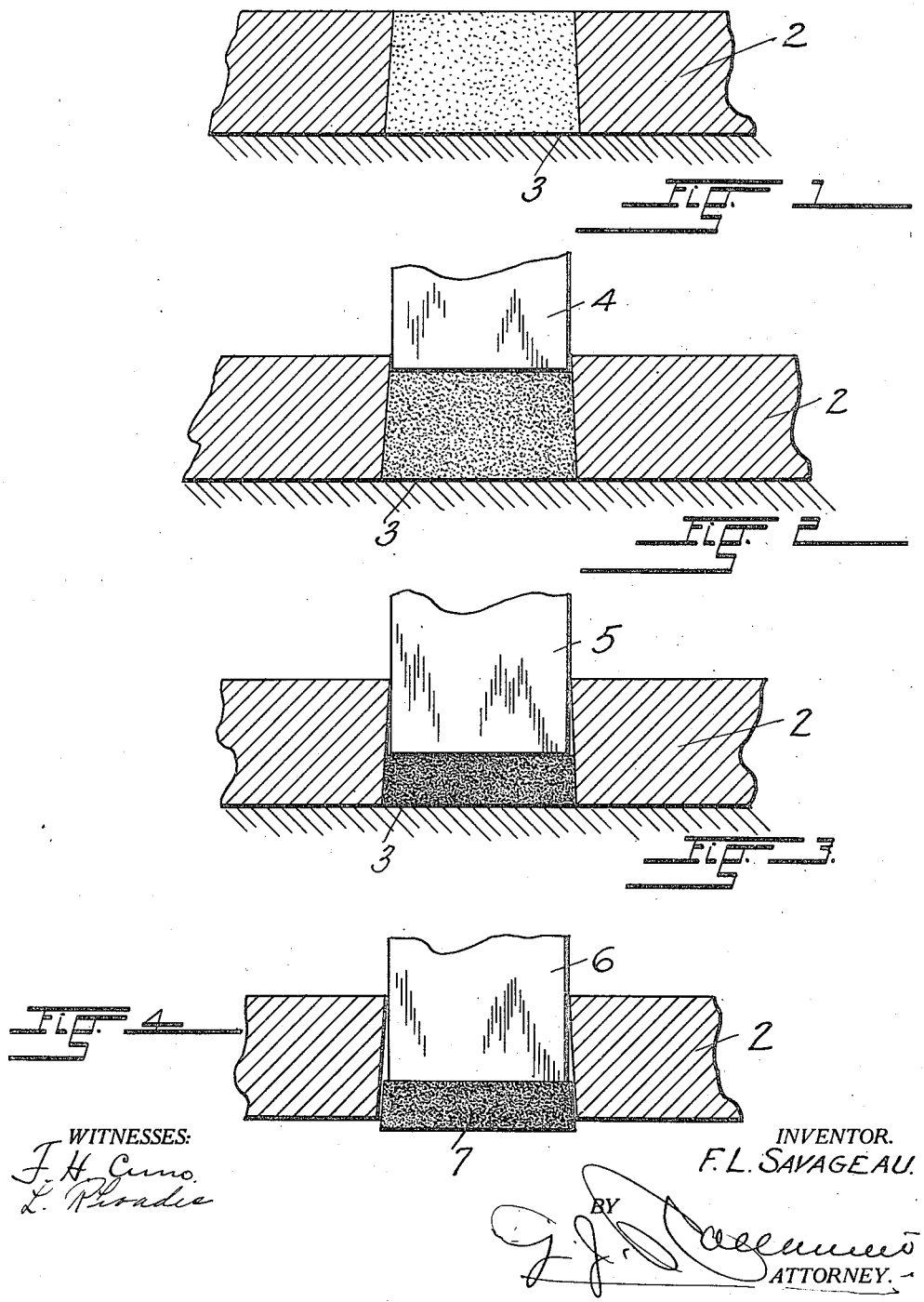

FREDERICK L. SAVAGEAU, OF DENVER, COLORADO, ASSIGNOR TO THE INDEPENDENCE COFFEE AND SPICE COMPANY, A CORPORATION OF COLORADO.

PROCESS OF FORMING CAKES FROM COFFEE.

1,210,542.  Specification of Letters Patent.  Patented Jan. 2, 1917.

Application filed April 21, 1916. Serial No. 92,733.

*To all whom it may concern:*

Be it known that I, FREDERICK L. SAVAGEAU, a citizen of the United States, residing at Denver, in the county of Denver and State of Colorado, have invented certain new and useful Improvements in Processes of Forming Cakes from Coffee, of which the following is a specification.

This invention relates to a method of producing cakes of ground coffee, and its principal object is to provide a simple method of concreting coffee into solid cakes or briquets which may be kept for an indefinite period, which remain intact irrespective of climatic influences, which provide measured quantities of coffee in convenient and greatly condensed form, thereby saving in cost of packing and transportation, which are free from foreign substances, which may be handled without breaking or chipping, which will preserve without loss the original flavor of the coffee for an unlimited period, and which owing to their density will not be subject to the influence of dampness or foreign odors.

I am aware that briquets of the character above referred to have been produced heretofore by different methods, but I know of no method by which these cakes have been made to successfully combine all the above enumerated qualities.

The first essential step in my improved method of producing cakes of ground coffee is the roasting-process to which the coffee is subjected until its agglutinative constituents have been liberated without their appearing on the surface of the beans.

The object of roasting the coffee to this degree, is to utilize the agglutinants of the coffee for effecting a permanent adhesion of the finely divided solid matter of which the cakes are composed. If these substances were brought to the surface of the beans as occurs by roasting them beyond the specified degree they would solidify and evaporate and thus become inadequate for the purpose of combining the ground coffee into a solid mass.

It will thus be seen that it is of the greatest importance that the beans are roasted to the degree hereinbefore described.

In connection with the above it should be understood that the degree at which the coffee is roasted is varied somewhat in accordance with the pressure to which it is subsequently subjected in forming the briquets, it being obvious that owing to the expansion of the softened beans as the roast progresses the degree of pressure required for forming them into briquets of the desired density, is proportionate in inverse ratio to the lightness of the roast.

After the beans have been roasted, they are ground and screened, preferably by what is known in the art as the "steel-cut" process, and while being screened and sized, the chaff is removed from the ground product by suction or other suitable means. This removal of the chaff and pulverized coffee is another important feature in the process of producing the cakes, inasmuch as its presence not only renders the cakes more brittle, but by its bulk prevents the concretion of a determinate quantity of coffee into a cake of predetermined proportions.

Before the ground and sized coffee from which the chaff has been removed, is pressed into cakes, it is first heated in order to increase the adhesive properties of its agglutinative constituents after which a measured quantity is subjected to an action for the expulsion of air and then subjected to a pressure of over two thousand pounds per square inch whereby its volume is reduced about sixty seven and one-half per cent.

The actions for removing the air from the coffee and for concreting the same into a cake of the desired proportions, take place while a measured quantity of coffee is confined in a mold of suitable form and construction.

Prior to the actions to which the coffee is subjected while in the mold, a viscid substance such as liquid burned sugar, is applied to the parts with which the coffee comes in contact, for the purpose of covering its surfaces with a coating which excludes air from the interior of the cakes and serves to prevent breaking and chipping.

After the coffee has been compressed into a cake of the required dimensions, it is released from lateral pressure for the purpose of preventing its adhesion to the parts of the mold, and consequent chipping while it is being removed from the press.

The elimination of air from the measured quantity of ground coffee is preferably effected by subjecting the said quantity after it has been disposed in the mold in which it is subsequently compressed, to a slight preliminary pressure which brings its particles into juxtaposition without compression and thereby forces the air from between the same.

The protective coating may be applied to the cake by supplying the surfaces of the parts of the press with which the cakes come in contact, with a layer of liquid-burned sugar or other viscid substance, and the cake may be relieved from lateral pressure while being discharged from the mold by tapering the sides of the latter. I desire it understood, however, that other means for accomplishing these results may be resorted to within the spirit of my invention and that my improved method for concreting coffee into cakes, is independent of any specific mechanical apparatus.

In the accompanying drawings in the various views of which like parts are similarly designated, Figure 1 represents a sectional view of a mold filled with a quantity of coffee roasted, ground, screened and cleaned in accordance with my method, Fig. 2, shows a mold with the same quantity of coffee after it has been subjected to a preliminary pressure for the elimination of air, Fig. 3, shows the mold after the cake has been formed therein by compression of the coffee, and Fig. 4, illustrates the method of removing the cake from the mold while relieving it from lateral pressure.

The reference character 2 designates a mold the sides of which slant outwardly for the purpose of relieving the cakes from pressure while they are being removed, and 3 designates the surface upon which the coffee is supported while it is subjected to pressure.

The numeral 4 designates the plunger which subjects the coffee to a preliminary pressure for the expulsion of air, 5 a plunger by which the coffee is reduced in volume more than fifty per cent., and 6 the plunger by which the cake 7 is removed from the mold.

It should be understood that while it is very desirable to coat the cakes for hardening their surfaces, this step of my process may be omitted under certain conditions, especially when the cakes are to be sold for immediate use.

Having thus described my invention, what I claim and desire to secure by Letters-Patent is:

1. The herein described process of forming coffee into cakes consisting in roasting coffee-beans to a degree sufficient to liberate their agglutinative constituents without exposing the same on the surface of the beans, grinding and sizing the coffee beans and removing the chaff from the ground product, then heating the ground coffee, expelling air from a measured quantity of the ground coffee, subjecting the said quantity of coffee to a pressure for reducing its volume over fifty per cent. and forming it into cakes, hardening the surface of the cake by the application of a protective coating, and finally relieving the cake from lateral pressure for its removal from the parts with which it was in contact while subjected to pressure.

2. The herein described process of forming coffee into cakes consisting in roasting coffee-beans to a degree sufficient to liberate their agglutinative constituents without exposing the same on the surface of the beans, grinding and sizing the coffee beans and removing the chaff from the ground product, heating the ground coffee, expelling air from a measured quantity of the ground coffee, subjecting the said quantity of coffee to a pressure for reducing its volume over fifty per cent. and forming it into cakes, and hardening the surface of the cake by the application of a protective coating.

3. The herein described process of forming coffee into cakes consisting in roasting coffee-beans to a degree sufficient to liberate their agglutinative constituents without exposing the same on the surface of the beans, heating the roasted coffee, expelling air from a measured quantity of the roasted coffee, and subjecting the said quantity of coffee to a pressure for reducing its volume over fifty per cent. and forming it into cakes.

4. The herein described process of forming coffee into cakes consisting in roasting coffee-beans to a degree sufficient to liberate their agglutinative constituents without exposing the same on the surface of the beans, expelling air from a measured quantity of the roasted coffee and finally subjecting the said quantity of coffee to a pressure for reducing its volume over fifty per cent. and forming it into cakes.

5. The herein described process of forming coffee into cakes consisting in roasting coffee-beans to a degree sufficient to liberate their agglutinative constituents without exposing the same on the surface of the beans, and subjecting a quantity of the roasted coffee to a pressure for reducing its volume over fifty per cent. and forming it into cakes.

6. The herein described process of forming coffee into cakes consisting in roasting coffee-beans to a degree sufficient to liberate their agglutinative constituents without exposing the same on the surface of the beans, grinding and sizing the coffee beans, and removing the chaff from the ground product, and subjecting a quantity of the ground coffee to a pressure for reducing its volume over fifty per cent. and forming it into cakes.

7. The herein described process of forming coffee into cakes consisting in roasting coffee-beans to a degree sufficient to liberate their agglutinative constituents without exposing the same on the surface of the beans, subjecting a quantity of the roasted coffee to a pressure for reducing its volume over fifty per cent. and forming it into cakes, and hardening the surface of the cake by the application of a protective coating.

8. The herein described process of forming coffee into cakes consisting in roasting coffee-beans to a degree sufficient to liberate their agglutinative constituents without exposing the same on the surface of the beans, subjecting a quantity of the roasted coffee to a pressure for reducing its volume over fifty per cent. and forming it into cakes, and relieving the cake from lateral pressure for its removal from the parts with which it was in contact while subjected to pressure.

9. The herein described process of forming coffee into cakes consisting in roasting coffee-beans to a degree sufficient to liberate their agglutinative constituents without exposing the same on the surface of the beans, and subjecting a quantity of the roasted coffee to a pressure for reducing its volume and forming it into cakes.

In testimony whereof I have affixed my signature in presence of two witnesses.

FREDERICK L. SAVAGEAU.

Witnesses:
G. J. ROLLANDET,
L. RHOADES.